US009530107B2

(12) United States Patent
Kang

(10) Patent No.: US 9,530,107 B2
(45) Date of Patent: Dec. 27, 2016

(54) METHOD, APPARATUS, AND SYSTEM FOR PROVIDING A SERVICE

(75) Inventor: Moon-Soon Kang, Seongnam-si (KR)

(73) Assignee: KT Corporation, Seongnam (KR)

(*) Notice: Subject to any disclaimer, the term of this patent is extended or adjusted under 35 U.S.C. 154(b) by 715 days.

(21) Appl. No.: 13/442,296

(22) Filed: Apr. 9, 2012

(65) Prior Publication Data

US 2012/0256729 A1 Oct. 11, 2012

(30) Foreign Application Priority Data

Apr. 8, 2011 (KR) ........................ 10-2011-0032896

(51) Int. Cl.
*H04Q 5/22* (2006.01)
*G06Q 10/00* (2012.01)

(52) U.S. Cl.
CPC ..................................... *G06Q 10/00* (2013.01)

(58) Field of Classification Search
CPC .............................. C07K 14/715; G06Q 10/00
USPC ........................... 340/10.1; 455/418; 235/375
See application file for complete search history.

(56) References Cited

U.S. PATENT DOCUMENTS 8,386,339 B2* 2/2013 Minnick et al. ........... 705/26.81
8,438,245 B2* 5/2013 Chor ............................ 709/219

2008/0016079 A1* 1/2008 Schroeder .......... G01C 21/3679
2012/0088487 A1* 4/2012 Khan ............................ 455/418
2012/0138671 A1* 6/2012 Gaede et al. ................. 235/375

FOREIGN PATENT DOCUMENTS

| JP | 2004140823 A | 5/2004 |
| KR | 20090002468 A | 1/2009 |
| KR | 101018432 B1 | 3/2011 |

OTHER PUBLICATIONS

Korean Patent Office, "Office Action," issued in connection with Korean Patent Application No. 2011-0032896, dated Oct. 30, 2014.

* cited by examiner

*Primary Examiner* — Omer S Khan
(74) *Attorney, Agent, or Firm* — Sughrue Mion, PLLC

(57) ABSTRACT

A method and a system for providing a service are provided. In the method for providing the service, a user terminal receives customized information among individuals or group members. The method includes: obtaining tag information by reading a tag attached to an object, the tag information containing a tag code and service data; obtaining service access information from an Object Directory Service (ODS) server when the tag is tagged in a situation, the service access information corresponding to at least one of the obtained tag information and identification information; and receiving a customized information service corresponding to the user terminal by accessing a service providing server in accordance with the service access information.

15 Claims, 6 Drawing Sheets ably illustrating a configuration of a system for providing a service that can provide a customized information service among individuals or group members through tagging in accordance with an exemplary embodiment.

METHOD, APPARATUS, AND SYSTEM FOR PROVIDING A SERVICE

CROSS-REFERENCE TO RELATED APPLICATIONS

This application claims priority from Korean Patent Application No. 10-2011-0032896, filed with the Korean Intellectual Property Office on Apr. 8, 2011, the disclosure of which is incorporated herein by reference in its entirety.

BACKGROUND

1. Field

Methods, apparatuses and systems consistent with exemplary embodiments relate to a method and system for providing a customized information service among individuals or group members through tagging.

2. Description of the Related Art

With the rapid progress of telecommunication technologies, there have been efforts to develop so-called ubiquitous environments, in which telecommunication devices can be applied to real life in a natural, convenient way without being restricted by time and space. Indispensable to building these ubiquitous environments is the wireless identification technology, which includes RFID (Radio Frequency Identification) and NFC (Near Field Communication), in which telecommunication devices can detect and identify one another remotely and effectively.

The wireless identification technology, which is an area of the automatic identification technology, such as barcodes, magnetic sensors, IC (integrated circuit) cards, etc., uses ultrashort waves or long waves to wirelessly identify data stored in a microchip, thereby allowing a reader to identify a tag attached to an object.

The conventional wireless identification technology simply displays tag information stored in the tag or provides a service by accessing an ODS (Object Directory Service) server based on the tag information to connect to an OIS (Object Information Service) server, in which real information is located. In this kind of conventional wireless identification technology, a single tag has one connection address only.

SUMMARY

Exemplary embodiments provide a method, apparatus, and a system for providing a customized information service among individuals or group members through a wireless identification technology, i.e., through tagging.

An exemplary embodiment can provide a method for providing a service, in which a user terminal receives customized information among individuals or group members, the method including: obtaining tag information by reading a tag attached to an object, the tag information containing a tag code and service data; obtaining service access information from an Object Directory Service (ODS) server when the tag is read in a particular situation, the service access information corresponding to at least one of the obtained tag information and identification information; and receiving a customized information service corresponding to the user terminal by accessing a service providing server in accordance with the service access information.

An aspect of an exemplary embodiment provides a system for providing a separate, customized information service among individuals or group members when a tag is read in a particular situation.

Another aspect of an exemplary embodiment provides that the ODS server is not a commerial ODS server but is an ODS server that is self-defined for providing the customized information.

Yet another aspect of an exemplary embodiment provides an ODS server which stores the service access information corresponding to at least one from among the tag information and the identification information.

Yet another aspect of an exemplary embodiment provides that the identification information is at least one from among location information, time information, which reflects a time at which the tag is read by the user terminal, user information, service information corresponding to the particular situation, direction information of the user terminal at the time of reading the tag, and position information of the user terminal at the time of reading the tag.

The particular situation can be a state in which a particular is running. Also, the customized information service can be at least one from among an online community service, an information sharing service, an information providing service and placing a telephone call.

An exemplary embodiment can provide a user terminal that includes: an NFC module configured to obtain tag information by reading a tag attached to an object; and a controller configured to obtain service access information from an Object Directory Service (ODS) server when the tag is read in a particular situation and to request a customized information service by accessing a service providing server in accordance with the obtained service access information, the service access information corresponding to at least one from among the tag information and identification information.

Some of the above-described aspects of exemplary embodiments can be implemented with the user terminal.

Another exemplary embodiment can provide a system for providing a service that includes: a user terminal configured to transmit a request for access information, the request for access information including at least one from among tag information and identification information; and an ODS server configured to provide service access information corresponding to the at least one from among the tag information and the identification information in accordance with the request for the service access information. The user terminal can receive a customized information service by accessing a service providing server in accordance with the service access information.

Yet another exemplary embodiment can provide a method for providing a customized information service to a user via a user terminal. The method includes: reading a tag attached to an object; and receiving the customized information service based on first information retrieved from the tag and second information from the user terminal.

Some of the above-described aspects of exemplary embodiments can be implemented with the above-described user terminal and the method described immediately above.

DETAILED DESCRIPTION

Since there can be a variety of permutations and exemplary embodiments, certain exemplary embodiments will be illustrated and described with reference to the accompanying drawings. This, however, is by no means to restrict the present invention to certain exemplary embodiments, and shall be construed as including all permutations, equivalents and substitutes covered by the ideas and scope of the present invention.

Terms such as "first" and "second" can be used in describing various elements, but the above elements shall not be restricted to the above terms. The above terms are used only to distinguish one element from the other.

The terms used in the description are intended to describe certain exemplary embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, certain exemplary embodiments will be described with reference to the accompanying drawings.

Rather than providing a service based on tag information obtained through a conventional tag, exemplary embodiments a service for on-line or off-line communication among individuals or group members, when a user terminal reads a tag in a particular situation. This will become apparent more clearly through the below description.

Figure 1:
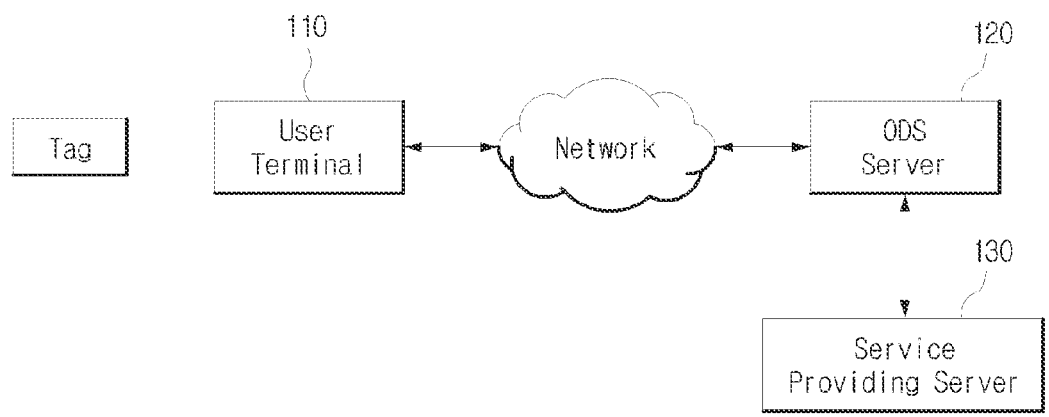
FIG. 1 is a block diagram briefly illustrating a configuration of a system for providing a service that can provide a customized information service among individuals or group members through tagging in accordance with an exemplary embodiment.

FIG. 1 is a block diagram briefly illustrating a configuration of a system for providing a service that can provide a customized information service among individuals or group members through reading a tag in accordance with an exemplary embodiment.

Referring to FIG. 1, the system for providing a service is configured by including a user terminal 110, an object directory service (ODS) server 120 and a service providing server 130.

The user terminal 110 is a device that can be provided with a customized information service among individuals or group members through reading a tag attached to a product in a particular situation (for example, while a particular application is running).

For instance, the customized information service described in this specification can be an access service to an on-line community, a bulletin board, a blog and a cybercafe, which are available among individuals or group members, or can be an information sharing service for off-line gathering. Of course, a communication service described in this specification can be a message delivery service that is shared among individuals or group members.

Moreover, the customized information service can be a service for making a connection to personally-configured information (e.g., information for placing a phone call) when the tag attached to the product is read in a particular situation, other than to information initially written in the tag, for example, an Internet bookmark service. In another example, the customized information service can be a service for providing configured information (e.g., music, video, etc.) when the tag is read in a particular situation. In other words, it shall be appreciated that the customized information service can be any kind of service that can be provided with information on line through a separately-designated ODS server, rather than through a conventional commercial ODS server, when the tag is read in a particular situation.

For example, if the tag is read while a particular application distributed by a provider (or an administrator) providing a particular service is running, the user terminal 110 can obtain service access information corresponding to tag information or identification information obtained through the reading from the ODS server 120. The tag information includes at least one from among a tag code, a telephone number, an URL, business card information, memo, application information and a coupon. The tag code is identification information for identifying the tag.

Here, the identification information can be service identification information corresponding to location information at which the tag is read, time information, user information (e.g., telephone number, terminal serial information) and a pertinent application. The identification information can be inputted by a user or can be pre-configured in the application. Moreover, the identification information can be direction information in which the tag is read or can be position information of the user terminal. For example, the direction information, in which the tag is read, can be 0 degree, 90 degrees, 180 degrees, 270 degrees, etc. The position information, which is information on the position of the user terminal when the tag is read, can be horizontal or vertical.

The identification information can be identification information that is configured for accessing a self-defined, separate ODS server, not a commercial ODS server.

Some examples of types of the user terminal 110 include portable personal devices, such as a mobile communication terminal, a web pad and a tablet PC. That is, any device that has a reader for reading a tag and has the communication functionality can be equivalently used for the user terminal 110.

Moreover, although it is described here that an electronic tag is attached to a product, it shall be appreciated that a bar code, a QR code and the like can be equivalently utilized instead of the electronic tag.

The ODS server 120 stores service access information corresponding to the tag information and the identification information. Accordingly, the ODS server 120 can extract different service access information based on the kind of request for access information of the user terminal 110 and provide the access information to the pertinent user terminal 110. Here, the service access information can be a uniform resource identifier (URI).

Unlike the conventional commercial ODS server, the ODS server 120 in the present description is a self-defined ODS server for accessing different services (or information, pages, etc.) based on the service information provided by a service provider, rather than providing the same information for accessing an unvarying service (or page) according to the tag information written in a single tag.

Hereinafter, the conventional commercial ODS server will be briefly described for better understanding and description.

Like an Internet domain, the conventional commercial ODS server includes a certain system of directory structure. For example, the conventional commercial ODS server has a directory structure that includes a root ODS and a plurality of local ODSs underneath the root ODS. Here, the root ODS is managed by the NIDA (National Internet Development Agency), and the local ODSs are managed by businesses that issued the respective tags attached to the product (for example, if the tag is attached to a particular product by company S, the local ODS is managed by company S). Accordingly, the conventional commercial ODS server extracts and provides the same information to every user having read the tag, based on the tag information written in the tag attached to the product.

Unlike this, the ODS server 120 in accordance with an exemplary embodiment is a separate self-defined device that is different from the conventional commercial ODS server provided by providers providing respective services.

Accordingly, it is possible for the ODS server 120 in accordance with an exemplary embodiment to store different service access information according to the tag information and the identification information and then provide services that are respectively different according to the tag information and identification information received by the user terminal 110.

That is, the ODS server 120 in accordance with an exemplary embodiment can store service access information for providing services that are different according to the respective identification information distinguished for the same tag by the user or a particular service administrator and can provide the service access information for accessing services that are different among individuals or members of a particular group. Hereinafter, unless specified otherwise, it shall be understood that the ODS server 120 is the self-defined ODS server that is provided by the service provider.

Accordingly, even if a plurality of users tag the same tag, the ODS server 120 can provide the respective user terminals the different service access information depending on whether or not an application is executed in the user terminal 110 possessed by the pertinent user or according to the service information configured in the executed application.

Accordingly, in accordance with an exemplary embodiment, the customized information service between individuals or group members can be provided to the respective users. This will be described below in more detail with reference to the accompanying drawings.

The service providing server 130 performs the function of providing a customized information service requested by the user terminal 110 to the user terminal 110.

For example, if the user terminal 110 obtains service access information corresponding to the tag information and the identification information from the ODS server 120, the customized information service designated according to the pertinent service access information can be provided to the user terminal 110. As described above, the customized information service can be any one of online community service (e.g., a bulletin board, blog, cybercafe, etc.), information providing service (e.g., music, video, text, etc.), call connection service and information sharing service (e.g., message delivery).

Figure 2:
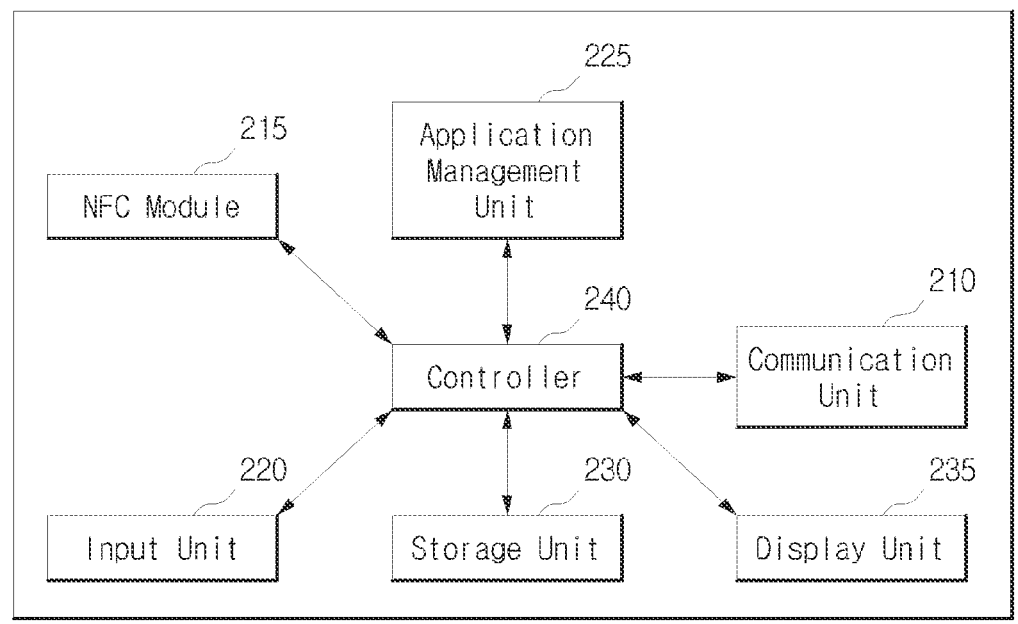
FIG. 2 is a block diagram briefly illustrating a configuration inside a user terminal of FIG. 1

FIG. 2 is a block diagram briefly illustrating a configuration inside the user terminal of FIG. 1.

Referring to FIG. 1, the user terminal 110 is constituted by including a communication unit 210, an NFC module 215, an input unit 220, an application management unit 225, a storage unit 230, a display unit 235 and a controller 240.

The communication unit 210 sends and receives data to and from another device (e.g., the ODS server 120 or the service providing server 130) through a communication network.

For example, the communication unit 210 can send a request to provide a service, to the ODS server 120 in accordance with a control of the controller 240. Moreover, the communication unit 210 can be provided with the service access information from the ODS server 120.

The NFC module 215 is configured to carry out data communication using short-range wireless technologies that operate at 13.56 MHz. The NFC module 215 can be attached to a smart card that is installed in the user terminal 110 or can be attached to the user terminal 110. The NFC module 110 includes both a tag mode and a reader mode. The NFC module 215 can also perform data communication with other devices that are installed with the NFC module 215 through near field communication in a P2P (peer-to-peer) method.

Hereinafter, it will be assumed for the convenience of description and understanding that the NFC module 215 is operated in the reader mode.

For example, the NFC module 215 obtains the tag information by reading the tag attached to an object. Here, the tag information includes at least one from among a tag code and service data. The tag code, which is identification information for identifying the tag, can be a combination of at least one number and at least one letter.

The input unit 220 is configured to receive a control command for controlling the user terminal 110, a control command for running an application, and the like from the user.

For example, the input unit 220 can be realized with a plurality of key buttons (e.g., alphanumeric keys and * and # keys) and one or more function keys (e.g., menu key(s), a CALL key, an OK key, a RUN key, etc.) or can be realized in the form of a touch screen.

The application management unit 225 is configured to install and manage a particular application that is downloaded from the service providing server 130 through the communication unit 210.

The storage unit 230 stores various applications required for operating the user terminal 110. Moreover, it is possible that the storage unit 230 stores the tag information obtained through the NFC module 215.

The display unit 235 is configured to output data inputted or stored in the user terminal 110 in the form of visual information. The display unit 235 can be a liquid crystal display (LCD).

The controller 240 is configured to control the internal components (e.g., the communication unit 210, the NFC module 215, the input unit 220, the application management unit 225, the storage unit 230, the display unit 235, etc.) of the user terminal 110.

Moreover, once the tag information is obtained through the NFC module 215 as a particular application is executed, the controller 240 can transmit a request for access information, which includes the pertinent tag information and identification information, through the communication unit 210 and obtain the service access information. Accordingly, the controller 240 can access the service providing server 130 in accordance with the pertinent service access information and be provided with a customized information service.

Although not illustrated in FIG. 2, the user terminal 110 can further include a sensor (not shown) for obtaining a direction in which the pertinent user terminal reads the tag. The sensor is configured, like a gyroscope, to assess an orientation or position of the user terminal 110 and can assess the orientation (or direction) or position of the pertinent user terminal when the tag is read in a particular situation. In this case, the controller 240 can use the orientation or position as the identification information to allow a different customized service to be provided for each orientation or position.

For example, if the tag is read in a first direction, the user terminal 110 can be allowed to access a commercial ODS server, and if the tag is read in a second direction, the user terminal 110 can be allowed to access a self-defined, separate ODS server. Moreover, the user terminal 110 can send the direction information as the identification information to the ODS server 120 to allow different services to be provided according to the directions of reading the tag.

In another example, if the tag is read while the user terminal 110 is in a first state (the terminal is positioned upright, i.e., 0 degree from a vertical direction), the user terminal 110 can be allowed to access a commercial ODS server, and if the tag is read while the user terminal 110 is in a second state (the terminal is flipped to the right, i.e., 90 degrees from the vertical direction), the user terminal 110 can be controlled to access the self-defined, separate ODS server. Moreover, the user terminal 110 can send the direction information as the identification information to the ODS server 120 to allow different services to be provided according to the directions of reading the tag.

Figure 3:
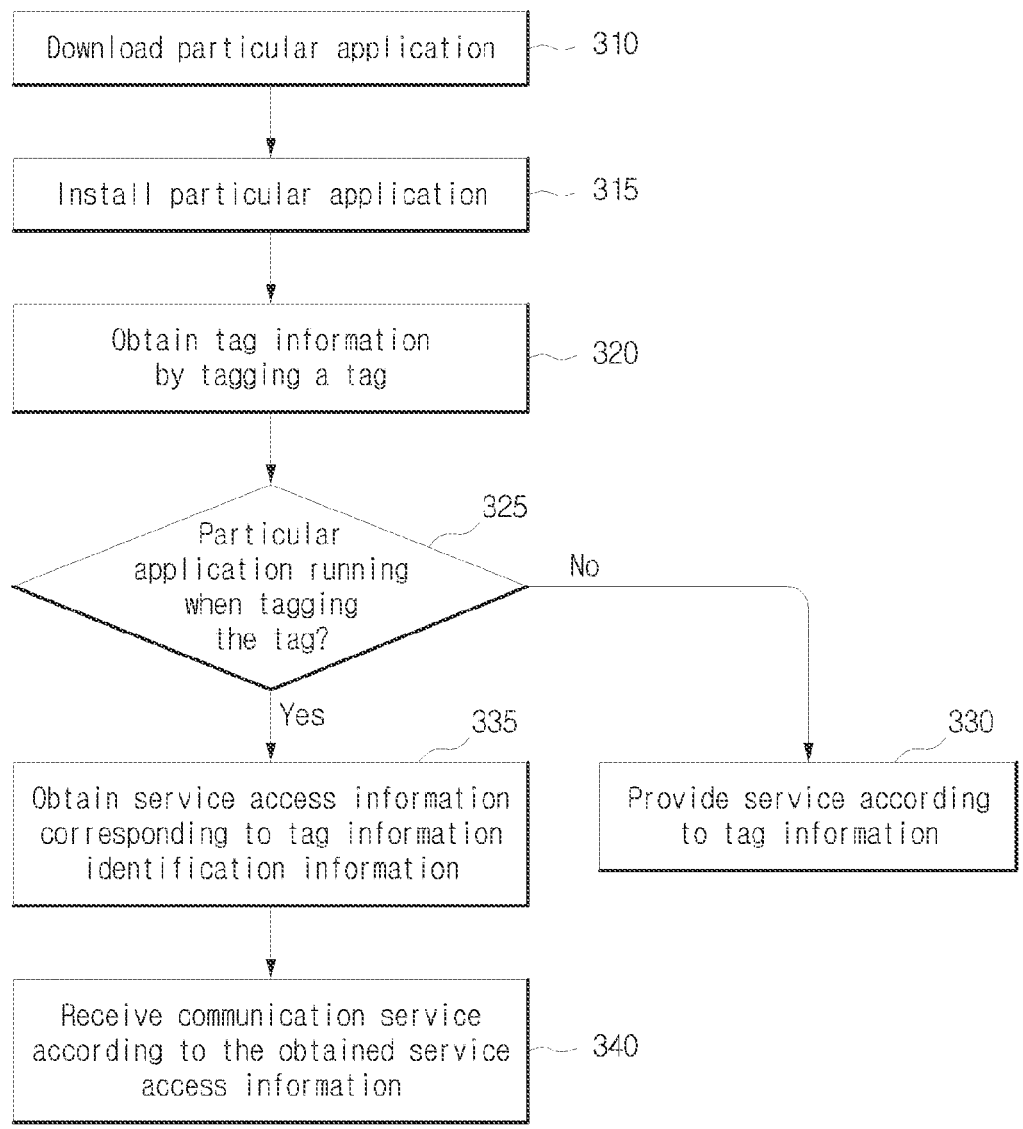
FIG. 3 is a flow diagram showing a method of providing the customized information service among individuals or group members by having the user terminal read a tag attached to a product.

FIG. 3 is a flow diagram showing a method of providing the customized information service among individuals or group members by having the user terminal read a tag attached to a product. Although the operations described below are carried out by the respective internal components of the user terminal, these internal components will be collectively referred to as the user terminal, for the convenience of description and understanding.

In operation 310, the user terminal 110 accesses a service providing server 130 to download an application. Here, the application includes service information having at least one from among application identification information and identification information. It is possible that the identification information is assigned when the application is downloaded, but depending on how it is realized, the identification information can be also assigned for each individual or each group when it is necessary after the application is downloaded.

In operation 315, the user terminal 110 installs the downloaded application. Although it is described herein that the device from which the application is being downloaded is the service providing server 130, it shall be appreciated that the application can be downloaded and installed through a separate web server, depending on the way it is realized.

In operation 320, the user terminal 110 reads the tag to obtain the tag information.

In operation 325, the user terminal 110 checks whether the particular application was running when the tag was read.

Although it is checked in operation 325 whether the particular application was running when the tag was read, for the convenience of description and understanding, it is generally possible that reading the tag is performed while the application is running.

Therefore, it shall be appreciated that, depending on the way it is realized, it can be checked whether the particular application is running before the user terminal 110 reads the tag and obtains the tag information.

If the particular application is not running, the user terminal 110 is processed in the conventional way, in operation 330.

However, if the particular application is running, the user terminal 110 obtains the service access information corresponding to the tag code and service information from the ODS server 120, in operation 335.

Then, in operation 340, the user terminal 110 accesses the service providing server 130 according to the service access information and receives a communication service.

Figure 4:
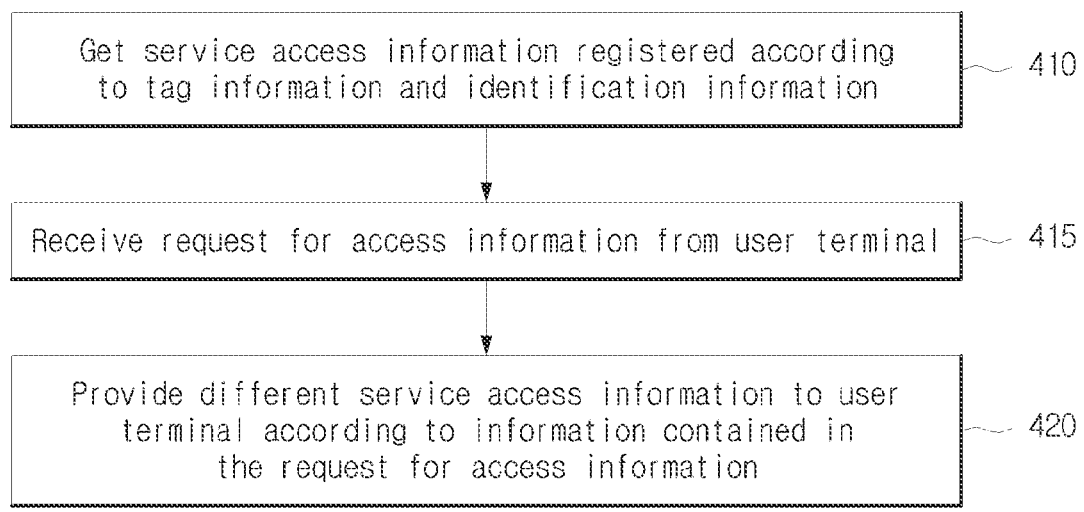
FIG. 4 is a flow diagram showing how an ODS server provides different information based on the request of the user terminal.

FIG. 4 is a flow diagram showing how the ODS server provides different information based on the request of the user terminal.

In operation 410, the ODS server 120 is registered with service access information according to at least one from among the tag information and the identification information from the service administrator.

As described earlier, the identification information can be the application identification information or separate identification information designated per service by the service provider or the user. Of course, it is also possible that the identification information is user information.

Although it is described herein for the convenience of description and understanding that the service administrator registers the service access information according to at least one from among the tag information and the identification information, the subject of registering the service access information according to at least one from among the tag information and the identification information can be an individual who is using the particular application, depending on the way it is realized.

In operation 415, the ODS server 120 receives a request for access information from the user terminal 110. Here, the request for access information can include at least one from among the tag information and the identification information.

In operation 420, the ODS server 120 extracts service access information corresponding to the request for access information and provides the service access information to the user terminal 110.

For example, if the request for access information includes tag information and identification information, the ODS server 120 can extract service access information corresponding to the tag information and the identification information and send the service access information to the user terminal 110.

Accordingly, the ODS server 120 can store service access information according to at least one from among the identification information per tag information and can provide different service access information according to requests for access information containing the same tag information and different identification information from a plurality of user terminals 110, allowing the user terminals 110 to receive different customized information services. This will be described in more detail with reference to FIGS. 5 to 7.

Moreover, the ODS server 120 can check whether a designated condition is set for the service access information corresponding to the tag information and identification information according to the request for access information and can provide the service access information to the user terminal 110 only if the designated condition is satisfied. Here, the designated condition can be time information (e.g., a particular date, a particular time, a particular day, etc.).

Figure 5:
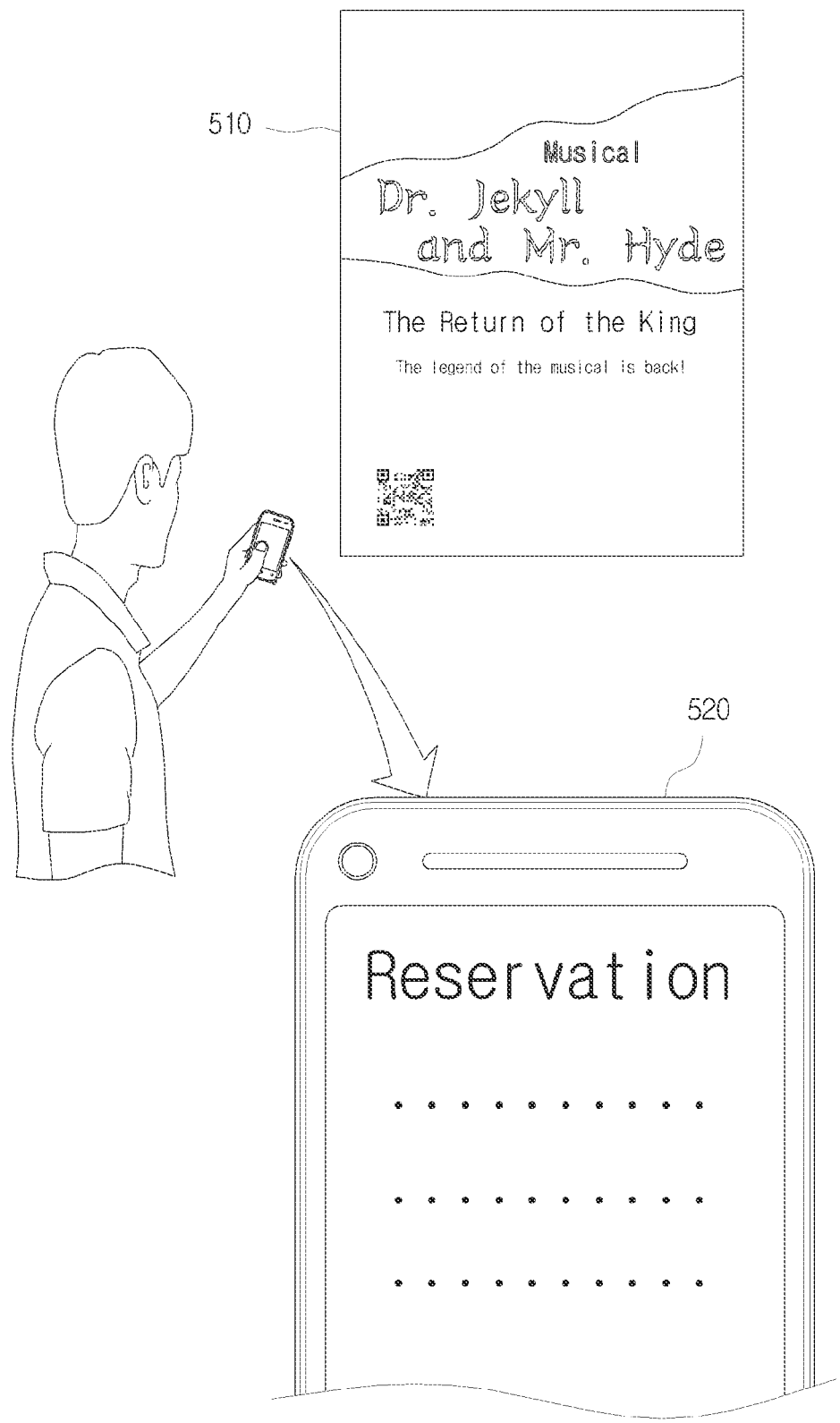
FIGS. 5 to 7 illustrate how the user terminal is provided with different services when the tag is read in different situations.
Figure 6:
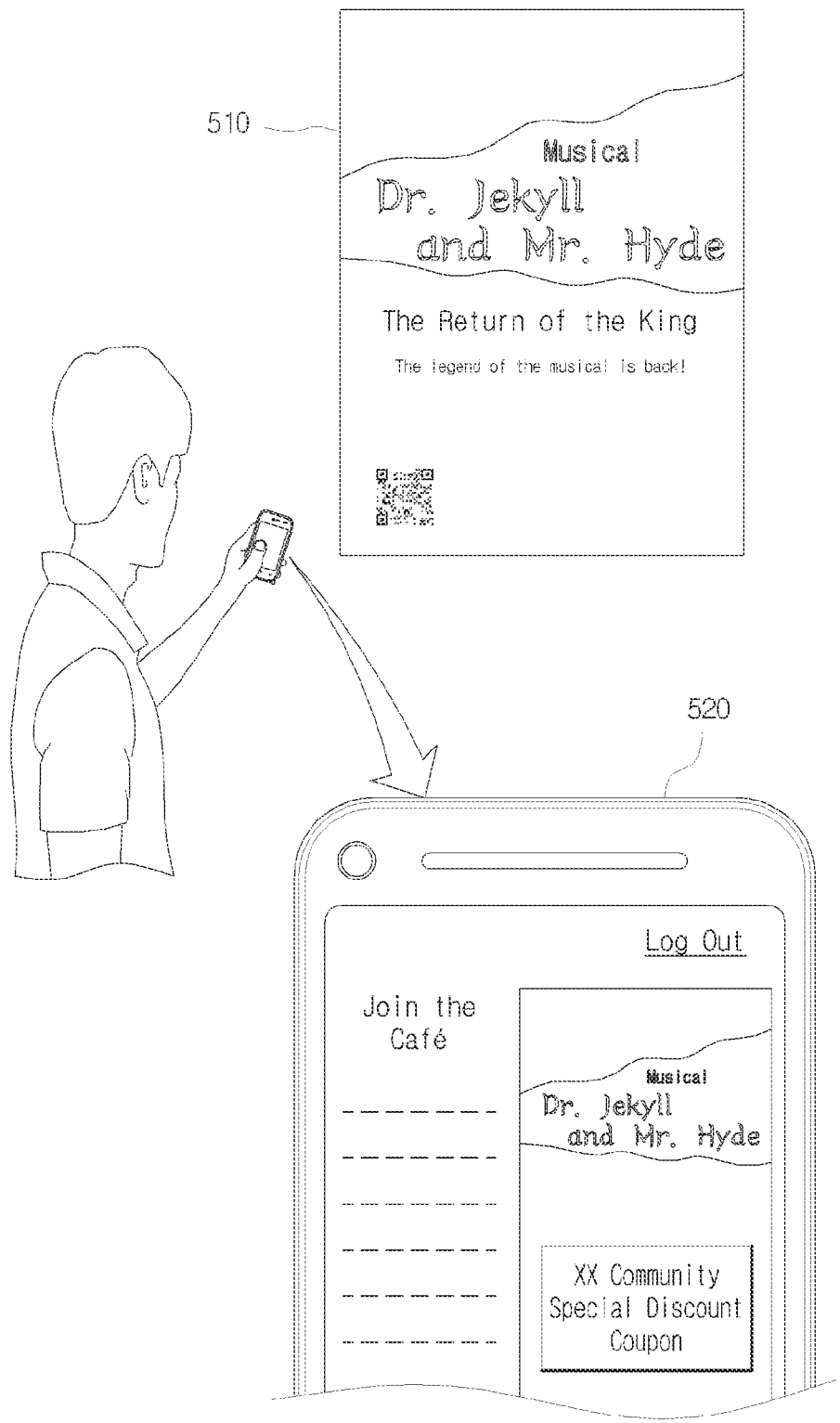
Figure 7:

FIGS. 5 to 7 illustrate how the user terminal is provided with different services when the tag is read in different situations.

For the convenience of description and understanding, it will be described that the tag is attached to a poster, as illustrated in reference numeral 510.

Once the tag attached to the poster is read using the user terminal 110 possessed by the user, the user terminal 110 is usually accessed to a site that can provide, for example, reservation and performance information of the poster, to which the tag is attached, and is provided with the information, as illustrated in FIG. 5.

Of course, in some cases, the user terminal 110 can be provided with general information related to a product to which the tag is attached.

However, as shown in FIG. 6, if the user reads the tag attached to the poster while a particular application installed in the user terminal 110 is running, a separate communication service designated by a communication service operator can be provided, rather than the service based on the tag information. Specifically, when the tag is read while the application is running, the user terminal 110 transmits a request for access information that includes tag information and identification information to the ODS server 120. Accordingly, the user terminal 110 can obtain access information to a fan club site, which is pre-registered in the ODS server 120 by the communication service operator, from the ODS server 120.

Then, the user terminal 110 can access the fan club site, which the user possessing the user terminal 110 has joined, using the access information to the fan club site obtained through the ODS server 120 and can be provided with a variety of information.

Of course, depending on the way it is realized, the user terminal 110 can be provided with the communication service after an authentication process by sending user information when accessing the fan club site using the access information.

In another example, as illustrated in FIG. 7, once the user terminal 110 obtains tag information by reading the tag while the particular application is running, the user terminal 110 can be provided with a message shared between individuals or among group members, using the tag information and the identification information.

In yet another example, the user can configure a separate communication service, using tags attached to a plurality of home appliances.

For example, the user can use the user terminal 110 to download and install a particular application provided by the service providing server 130, obtain tag information by reading a tag attached to the home appliances through the particular application and then configure identification information for each of the tag information.

Suppose, for the convenience of description and understanding, that a tag is attached to each of a television, a computer and a refrigerator for connection to a warranty service center of their respective manufacturer. After running the particular application installed in the user terminal 110, the user can obtain tag information of the tags attached to the television, the computer and the refrigerator, respectively, and then can map and store telephone number of particular persons whom the user often calls. In such a case, when the tag information is obtained by reading the tags attached to the television, the computer and the refrigerator, respectively, while the particular application is running in the user terminal 110, it becomes possible to connect to a personally-configured telephone number to particular information in accordance with the tag information.

Here, the connection of the user terminal 110 provided with the customized information service, can be different based on the time and location. For example, if the tag attached to the home appliance is read in the morning hours, a predetermined service (for watching the news, listening to favorite songs or running a favorite application, for example) can be provided. During the afternoon hours, the connection can be configured to place a call to a predetermined telephone number. Moreover, it is also possible to configure that different information is provided for each region in accordance with the tag information.

As such, in accordance with an exemplary embodiment, it is possible to configure the user terminal 110 to connect to a personal blog, a social network channel, etc. when a particular tag is tagged using the user terminal 110.

In another example, it is possible to allow participants of a flash mob, in which a large number of people are engaged in a same action or behavior, to enable the event by providing an event message to the participants when they read designated off-line tag(s). While the conventional flash mob requires a pre-appointed time, the present embodiment can motivate the participants with more interest due to added game-like, offline-linked elements by allowing the participants to obtain event information at the moment of the event by reading the tag(s) at a particular time.

In yet another example, if a user leaves a message in a tag that is located at a particular location, another user can read the message by reading the tag at this particular location. It is possible that the message is configured to be open to everyone or open to an individual only. It is also possible that the message is restricted to the particular location or unrelated to the location.

The method for providing a communication service among individuals or group members when the user terminal reads a tag in a particular situation in accordance with an exemplary embodiment can be embodied in the form of program instructions, which can be performed through various electronic data processing means, and can be written in a storage medium, which can include program instructions, data files, data structures and the combination thereof.

The program instructions stored in the storage medium can be designed and configured specifically or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of exemplary embodiments, and the opposite is also possible.

Although some exemplary embodiments have been described above, it shall be appreciated that there can be a variety of permutations and modifications by those who are ordinarily skilled in the art to which the present invention pertains without departing from the technical ideas and scope of exemplary embodiments, which shall be defined by the appended claims.

What is claimed is:

1. A method for providing a service, in which a user terminal receives customized information, among individuals or group members, the method comprising:
   obtaining tag information by reading a tag attached to an object in a state in which an application for a customized information services is running;
   transmitting an access information request to an Object Directory Service (ODS) server, the access information request comprising the obtained tag information and identification information, the identification information comprising a first portion corresponding to the obtained tag information wherein the first portion of the identification information is position information of the user terminal with respect to the tag at the time of reading the tag, and the identification information comprising a second portion wherein a user of the user terminal predefines the second portion of the identification information, the second portion of the identification information comprising at least one from among location information at which the tag is read, time information and user information;
   obtaining service access information corresponding to the access information request from the ODS server; and
   receiving a customized information service by accessing a service providing server in accordance with the service access information.

2. The method of claim 1, wherein the ODS server is self-defined for providing the customized information.

3. The method of claim 2, wherein the ODS server stores the service access information corresponding to at least the tag information and the identification information.

4. The method of claim 1, wherein the first portion of the identification information further includes service information corresponding to the state.

5. The method of claim 1, wherein the customized information service is at least one from among an online community service, an information sharing service, an information providing service and placing a telephone call.

6. A user terminal comprising:
   a Near Field Communication (NFC) module configured to obtain tag information by reading a tag attached to an object in a state in which an application for a customized information service is running; and
   a controller configured to transmit an access information request to an Object Directory Service (ODS) server, the access information request comprising the obtained tag information and identification information, obtain service access information corresponding to the access information request from the ODS server, and request a customized information service by accessing a service providing server in accordance with the obtained service access information,
   wherein the identification information comprises a first portion corresponding to the obtained tag information wherein the first portion of the identification information is position information of the user terminal with respect to the tag at the time of reading the tag, and the identification information comprises a second portion wherein a user of the user terminal predefines the second portion of the identification information, the second portion of the identification information comprising at least one from among location information at which the tag is read, time information and user information.

7. The user terminal of claim 6, further comprising:
   a communication unit configured to download the application by accessing the service providing server in accordance with control of the controller;
   an application management unit configured to install the downloaded application; and
   an input unit configured to be inputted with an execution command related to the application from a user.

8. The user terminal of claim 6, wherein the customized information service is at least one from among an online community service, an information sharing service, an information providing service and placing a telephone call.

9. A system for providing a service, the system comprising:
   a user terminal configured to transmit an access information request to an Object Directory Service (ODS) server, the access information request comprising the obtained tag information and identification information, the identification information comprising a first portion corresponding to the obtained tag information wherein the first portion of the identification information is position information of the user terminal with respect to the tag at the time of reading the tag, and the identification information comprising a second portion wherein a user of the user terminal predefines the second portion of the identification information, the second portion of the identification information comprising at least one from among location information at which the tag is read, time information and user information; and
   the Object Directory Service (ODS) server configured to provide service access information corresponding to the access information request,
   wherein the user terminal receives a customized information service by accessing a service providing server in accordance with the service access information, and
   wherein the tag information is acquired in a state in which an application for the customized information service.

10. The system of claim 9, wherein the ODS server is configured to provide the service access information to the user terminal only if a designated condition corresponding to the at least the tag information and the identification information is met.

11. The system of claim 10, wherein the designated condition relates to time information.

12. A method for providing a customized information service to a user via a user terminal, the method comprising:
   reading a tag attached to an object in a state in which an application for a customized information service is running;
   obtaining service access information from a first server based on first information retrieved from the tag and second information from the user terminal, and
   receiving the customized information service from a second server based on the service access information,
   wherein the second information is identification information comprising a first portion corresponding to the retrieved tag information wherein the first portion of the identification information is position information of the user terminal with respect to the tag at the time of reading the tag, and the identification information comprises a second portion wherein a user of the user terminal predefines the second portion of the identification information, the second portion of the identification information comprising at least one from among location information at which the tag is read, time information and user information.

13. The method of claim 12, wherein the first server is an Object Directory Service (ODS) server and the second server is a service providing server.

14. The method of claim 13, wherein the ODS server stores the service access information corresponding to at least the first information and the second information.

15. The method of claim 12, wherein the first portion of the second information further includes service information corresponding to the state.

* * * * *